| 
US007953294B2

(12) United States Patent
Andres del Valle

(10) Patent No.: US 7,953,294 B2
(45) Date of Patent: May 31, 2011

(54) RESHAPING A CAMERA IMAGE

(75) Inventor: Ana Cristina Andres del Valle, Antibes (FR)

(73) Assignee: Accenture Global Services Limited, Dublin (IE)

(*) Notice: Subject to any disclaimer, the term of this patent is extended or adjusted under 35 U.S.C. 154(b) by 826 days.

(21) Appl. No.: 11/674,255

(22) Filed: Feb. 13, 2007

(65) Prior Publication Data

US 2008/0175517 A1 Jul. 24, 2008

Related U.S. Application Data

(63) Continuation-in-part of application No. 11/625,937, filed on Jan. 23, 2007.

(51) Int. Cl.
*G06K 9/36* (2006.01)
(52) U.S. Cl. ......................... 382/291; 382/216; 382/289
(58) Field of Classification Search ............. 345/208.99; 348/333.12; 382/216, 289, 295, 296, 291, 382/312
See application file for complete search history.

(56) References Cited

U.S. PATENT DOCUMENTS

| 6,434,278 | B1 * | 8/2002 | Hashimoto | 382/285 |
| 7,218,774 | B2 * | 5/2007 | Liu | 382/154 |
| 2003/0076990 | A1 * | 4/2003 | Brand | 382/154 |
| 2008/0174795 | A1 | 7/2008 | Del Valle | |
| 2010/0014721 | A1 * | 1/2010 | Steinberg et al. | 382/118 |

OTHER PUBLICATIONS

Danino, Udy et al., Algorithm for Facial Weight-Change, Proc. 11th IEEE Internationa~ Conference on Electronics, Circuits and Systems CICECS2004), Tel Aviv, Israel, 2004, pp. 3~8-321.*

Danino, Udy et al., Algorithm for Facial Weight-Change, Proc. 11th IEEE International Conference on Electronics, Circuits and Systems (ICECS2004), 2004, pp. 318-321, Tel Aviv, Israel.
Rowland, D.A. et al., Transforming Facial Images in 2 and 3-D, Imagina 97-Conferences-ACTES/Proceedings, Feb. 1997, pp. 1-12, Monte Carlo.
Valente, Stephane et al., "A Visual Analysis/Synthesis Feedback Loop for Accurate Face Tracking," Signal Processing Image Communication, 2001, pp. 585-608, Elsevier Science B.V., France.
Valente, Stephane et al., "Face Tracking and Realistic Animations for Telecommunicant Clones," Multimedia Computing and Systems, 2000, pp. 34-43, France.
Andres del Valle, Ana C., Facial Motion Analysis on Monocular Images for Telecom Applications: Coupling Expression and Pose Understanding, 2003, pp. 1-338.
Andres del Valle, Ana C., Translation of French Thesis for "Facial Motion Analysis on Monocular Images for Telecom Applications: Coupling Expression and Pose Understanding," 2003.

(Continued)

*Primary Examiner* — Gregory F Cunningham
(74) *Attorney, Agent, or Firm* — Fish & Richardson P.C.

(57) ABSTRACT

Apparatuses, computer media, and methods for altering a camera image, in which the source image may be angularly displaced from a camera image. A plurality of points on the camera image is located and a mesh is generated. Compensation information based on the displacement is determined, and a reshaped image is rendered from the mesh, the compensation information, and the camera image. The camera image is reshaped by relocating a proper subset of the points on the camera image. Deformation vectors are applied to corresponding points on the mesh using the compensation information. A correction factor is obtained from an angular displacement and a translation displacement of the source image from the camera image. The deformation factor is multiplied by the compensation factor to form a deformation vector to compensate for angular and translational displacements of the source image from the camera image.

17 Claims, 10 Drawing Sheets

OTHER PUBLICATIONS

Hyneman, W., et al. "Human Face Project", International Conference on Computer Graphics and Interactive Techniques, ACM SIGGRAPH 2005 courses, Session: Digital Face Cloning" Article 5, 2005 pp. 29-46.

Knight, "Mirror that Reflects your Future Self", dated Feb. 2, 2005; downloaded from the internet at: http://www.newscientist.com/article/dn6952-mirror-that-reflects-your-future-self.html on Aug. 27, 2010, 2 pages.

Radford, "Through a Glass Darkly—Your Future", dated Feb. 3, 2005 downloaded from the internet at http://www.guardian.co.uk/uk/2005/feb/03/highereducation.science on Jul. 29, 2010, 1page.

U.S. Appl. No. 11/625,937, non-final Office Action dated May 12, 2010, to be published by the United States Patent and Trademark Office, 26 pages.

U.S. Appl. No. 11/625,937, Final Office Action dated Jan. 21, 2010, to be published by the United States Patent and Trademark Office, 30 pages.

U.S. Appl. No. 11/625,937, non-final Office Action dated Jul. 7, 2009, to be published by the United States Patent and Trademark Office, 19 pages.

Extended European Search Report for Application No. 08250268.3-2218/1950699 dated Feb. 15, 2011 (9 pages).

* cited by examiner

RESHAPING A CAMERA IMAGE

This application is a continuation-in-part of co-pending U.S. patent application Ser. No. 11/625,937 entitled "Reshaping an Image to Thin or Fatten a Face" and filed on Jan. 23, 2007, the entire disclosure of which is hereby incorporated by reference.

FIELD OF THE INVENTION

This invention relates to altering a camera image. More particularly, the invention applies to a source image being angularly displaced from the camera image plane.

BACKGROUND OF THE INVENTION

Excessive body weight is a major cause of many medical illnesses. With today's life style, people are typically exercising less and eating more. Needless to say, this life style is not conducive to good health. For example, it is acknowledged that type-2 diabetes is trending to epidemic proportions. Obesity appears to be a major contributor to this trend.

On the other hand, a smaller proportion of the population experiences from being underweight. However, the effects of being underweight may be even more divesting to the person than to another person being overweight. In numerous related cases, people eat too little as a result of a self-perception problem. Anorexia is one affliction that is often associated with being grossly underweight.

While being overweight or underweight may have organic causes, often such afflictions are the result of psychological issues. If one can objectively view the effect of being underweight or underweight, one may be motivated to change one's life style, e.g., eating in a healthier fashion or exercising more. Viewing a predicted image of one's body if one continues one's current life style may motivate the person to live in a healthier manner.

BRIEF SUMMARY OF THE INVENTION

Embodiments of invention provide apparatuses, computer media, and methods for altering a camera image, in which the source image may be angularly displaced from a camera image.

With an aspect of the invention, a plurality of points on the camera image is located and a mesh is generated. The mesh is superimposed on the camera image and associated with corresponding texture information of the camera image. Compensation information based on the displacement is determined, and a reshaped image is rendered from the mesh, the compensation information, and the camera image.

With another aspect of the invention, the camera image is reshaped by relocating a proper subset of the points on the camera image. Deformation vectors are applied to corresponding points on the mesh using the compensation information. A deformation vector may comprise a product of factors, including a weight value factor (A), a scale factor (s), a deformation factor (w), and a direction vector ($\vec{u}$).

With another aspect of the invention, a correction factor is obtained from an angular displacement and a translation displacement of the source image from the camera image. The deformation factor is multiplied by the compensation factor to form a deformation vector to compensate for angular and translational displacements of the source image from the camera image.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
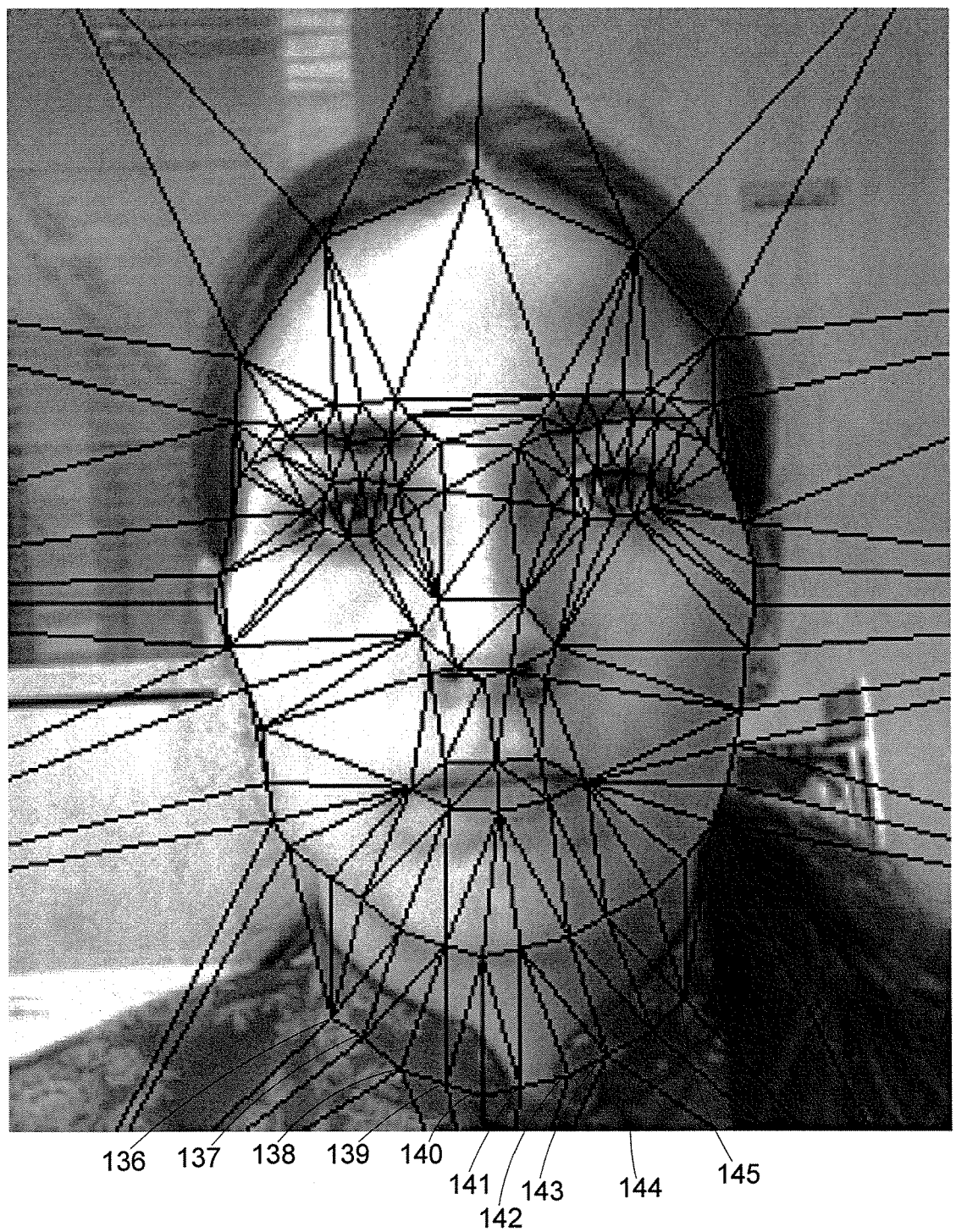
FIG. 1 shows a mesh that is superimposed in a face image in accordance with an embodiment of the image.

FIG. 1 shows a mesh that is superimposed in a face image in accordance with an embodiment of the image. As will be discussed, an algorithm fattens or thins the face image in accordance with an embodiment of the invention. Points along the face, neck, and image boundary are determined in order to form the mesh. As will be further discussed, the algorithm alters the facial contour and then reshapes the area around the neck. (Points 136-145 will be discussed in a later discussion.) The altered image is rendered by using the points as vertices of the mesh.

This mesh is associated to its corresponding texture from the picture where the alteration is taking place. The corners and four points along each side of the picture (as shown in FIG. 1) are also considered as part of the mesh. Computer graphics software API (Application Programming Interface) is used to render the altered image (e.g., as shown in FIGS. 4-7). OpenGL API is an example of computer graphics software that may be used to render the altered image.

Figure 2:
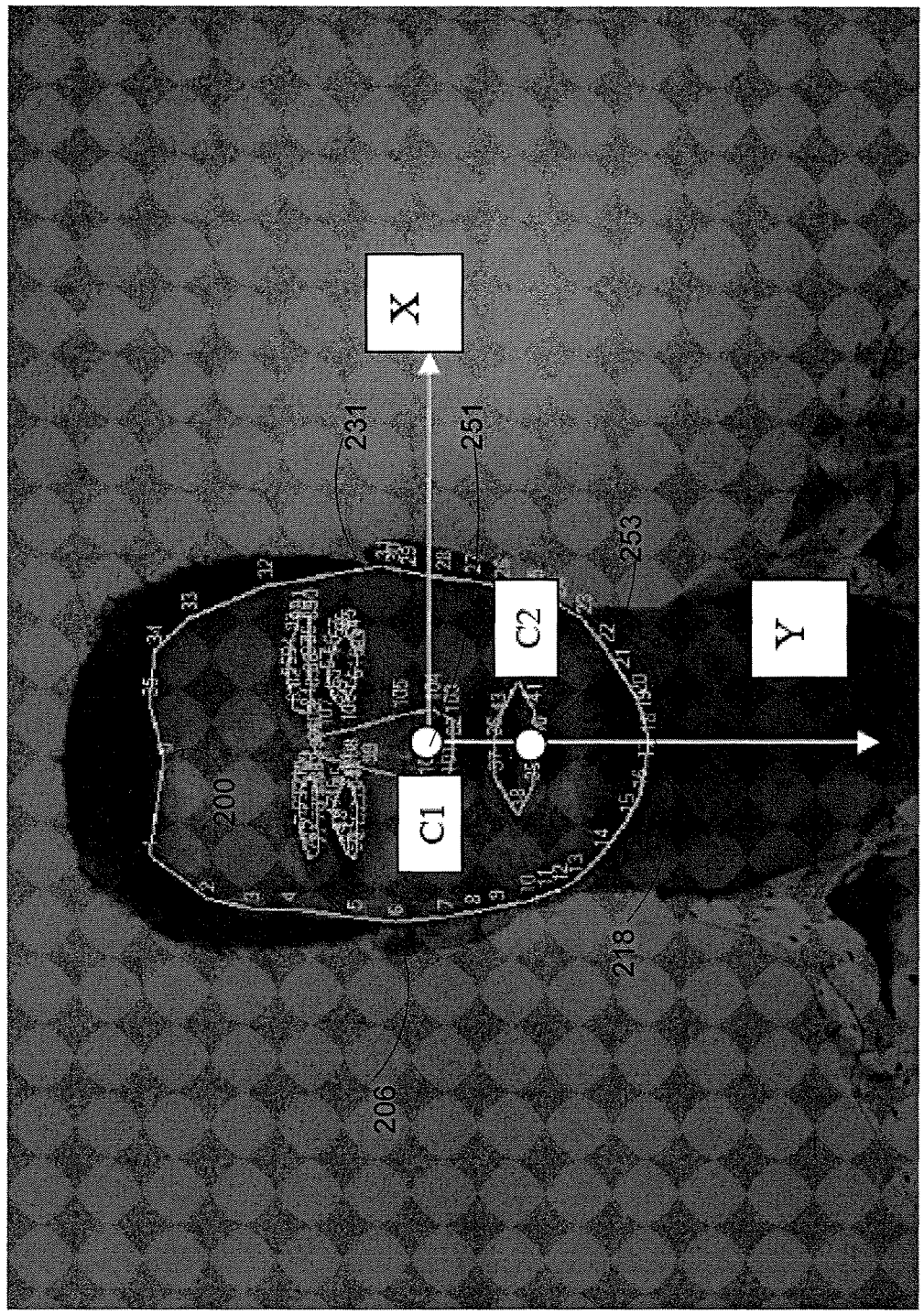
FIG. 2 shows a set of points for altering a face image in accordance with an embodiment of the invention.

FIG. 2 shows a set of points (including points 200, 206, 218, and 231 which will be discussed in further detail) for altering a face image in accordance with an embodiment of the invention. (Please note that FIG. 2 shows a plurality of points, which correspond to the vertices of the mesh.) Points 200, 206, 218, and 231 are only some of the plurality of points. An embodiment of the invention uses the search function of a software technique called Active Appearance Model (AAM), which utilizes a trained model. (Information about AAM is available at http://www2.imm.dtu.dk/~aam and has been utilized by other researchers.) However, points 200, 206, 218, and 231 may be determined with other approaches, e.g., a manual process that is performed by medical practitioner manually entering the points. With an embodiment of the invention, the trained model is an AMF file, which is obtained from the training process. For the training the AAM, a set of images with faces is needed. These images may belong to the same person or different people. Training is typically dependent on the desired degree of accuracy and the degree of universality of the population that is covered by the model. With an exemplary embodiment, one typically processes at least five images with the algorithm that is used. During the training process, the mesh is manually deformed on each image. Once all images are processed, the AAM algorithms are executed over the set of points and images, and a global texture/shape model is generated and stored in an AMF file. The AMF file permits an automatic search in future images not belonging to the training set. With an exemplary embodiment, one uses the AAM API to generate Appearance Model Files (AMF). Embodiments of the invention also support inputting the plurality of points through an input device as entered by a user. A mesh is superimposed on the image at points (e.g., the set of points shown in FIG. 2) as determined by the trained process.

Figure 3:
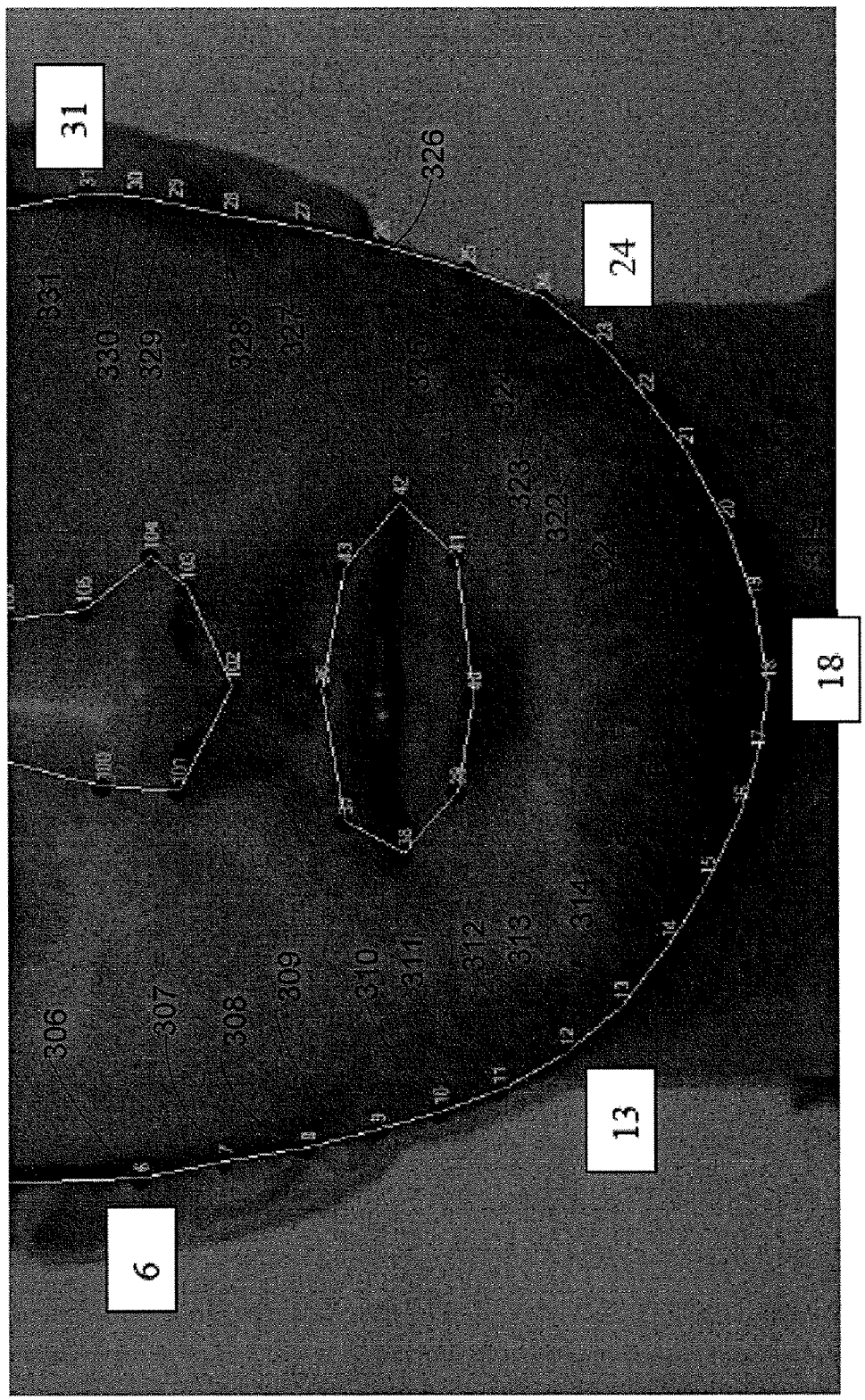
FIG. 3 shows controlling points for face alteration in accordance with an embodiment of the invention.

FIG. 2 also shows the orientation of the x and y coordinates of the points as shown in FIGS. 1-3.

FIG. 3 shows controlling points 306-331 for face alteration in accordance with an embodiment of the invention. (Points 306, 318, and 331 correspond to points 206, 218, and 231 respectively as shown in FIG. 2.) Points 306-331, which correspond to points around the cheeks and chin of the face, are relocated (transformed) for fattening or thinning a face image to a desired degree. With an embodiment of the invention, only a proper subset (points 306-331) of the plurality of points (as shown in FIG. 2) are relocated. (With a proper subset, only some, and not all, of the plurality points are included.)

In the following discussion that describes the determination of the deformation vectors for reshaping the face image, index i=6 to index i=31 correspond to points 306 to points 331, respectively. The determined deformation vectors are added to points 306 to points 331 to re-position the point, forming a transformed mesh. A reshaped image is consequently rendered using the transformed mesh.

In accordance with embodiments of the invention, deformation vector correspond to a product of four elements (factors):

$$\vec{v}_d = \vec{u} \cdot s \cdot w \cdot A \qquad \text{(EQ. 1)}$$

where A is the weight value factor, s is the scale factor, w is the deformation factor, and $\vec{u}$ is the direction vector. In accordance with an embodiment of the invention:

Weight value factor [A]: It determines the strength of the thinning and fattening that we wan to apply.

$$A > 0 \text{ fattening} \qquad \text{(EQ. 2A)}$$

$$A < 0 \text{ thinning} \qquad \text{(EQ. 2B)}$$

$$A = 0 \text{ no change} \qquad \text{(EQ. 2C)}$$

Scale factor [s]. It is the value of the width of the face divided by B. One uses this factor to make this vector calculation independent of the size of the head we are working with. The value of B will influence how the refined is the scale of the deformation. It will give the units to the weight value that will be applied externally.

$$s = \frac{|x_{31} - x_6|}{B} \qquad \text{(EQ. 3)}$$

Deformation factor [w]. It is calculated differently for different parts of cheeks and chin. One uses a different equation depending on which part of the face one is processing:

$$i \in [6-13] \quad w_i = \frac{2}{3} \frac{1}{|x_6 - x_{13}|} |x_i - x_{C1}| + \frac{1}{3} \qquad \text{(EQ. 4A)}$$

$$i \in [14-18] \quad w_i = -\frac{1}{|x_{13} - x_{18}|^2} |x_i - x_{C1}|^2 + 1 \qquad \text{(EQ. 4B)}$$

$$i \in [19-23] \quad w_i = -\frac{1}{|x_{18} - x_{24}|^2} |x_i - x_{C1}|^2 + 1 \qquad \text{(EQ. 4C)}$$

$$i \in [24-31] \quad w_i = \frac{2}{3} \frac{1}{|x_{24} - x_{31}|} |x_i - x_{C2}| + \frac{1}{3} \qquad \text{(EQ. 4D)}$$

Direction vector [$\vec{u}$]: It indicates the sense of the deformation. One calculates the direction vector as the ratio between: the difference (for each coordinate) between the center and our point, and the absolute distance between this center and our point. One uses two different centers in this process: center C2 (point 253 as shown in FIG. 2) for the points belonging to the jaw and center C1 (point 251 as shown in FIG. 2) for the points belonging to the cheeks.

$$i \in [6-13] \& [24-31] \quad \vec{u}_i = \frac{x_i - x_{C1}}{|x_i - x_{C1}|} \qquad \text{(EQ. 5A)}$$

$$i \in [14-23] \quad \vec{u}_i = \frac{x_i - x_{C2}}{|x_i - x_{C2}|} \qquad \text{(EQ. 5B)}$$

Neck point-coordinates $x_i$ are based on the lower part of the face, where $$i \in [36-45] \qquad \text{(EQ. 6)}$$
$$j \in [14-23]$$
$$x_i = (x_j, y_j + \text{neck\_height})$$

$$\text{neck\_height} = \frac{y_{18} - y_0}{6} \qquad \text{(EQ. 7)}$$

where $y_{18}$ and $y_0$ are the y-coordinates of points 218 and 200, respectively, as shown in FIG. 2. Referring back to FIG. 1, index i=36 to i=45 correspond to points 136 to 145, respectively. Index j=14 to j=23 correspond to points 314 to 323, respectively, (as shown in FIG. 3) on the lower part of the face, from which points 136 to 145 on the neck are determined. (In an embodiment of the invention, points 136 to 145 are determined from points 314 to 323 before points 314 to 323 are relocated in accordance with EQs. 1-5.)

The deformation vector ($\vec{v}_{d\_neck}$) applied at points 136 to 145 has two components:

$$\vec{v}_{d\_neck} = (0, y_{d\_neck}) \qquad \text{(EQ. 8)}$$

when $x_i < x_{41}$ (EQ. 9A)

$$y_{d\_neck_f} = -\frac{(x_i - x_{18})^2}{10 \cdot \left(\frac{x_{24} - x_{13}}{2}\right)^2}$$

when $x_i \geq x_{41}$ (EQ. 9B)

$$y_{d\_neck_f} = -\frac{(x_i - x_{18})^2}{10 \cdot \left(\frac{x_{24} - x_{13}}{2}\right)^2}$$

The Appendix provides exemplary software code that implements the above algorithm.

Figure 4:
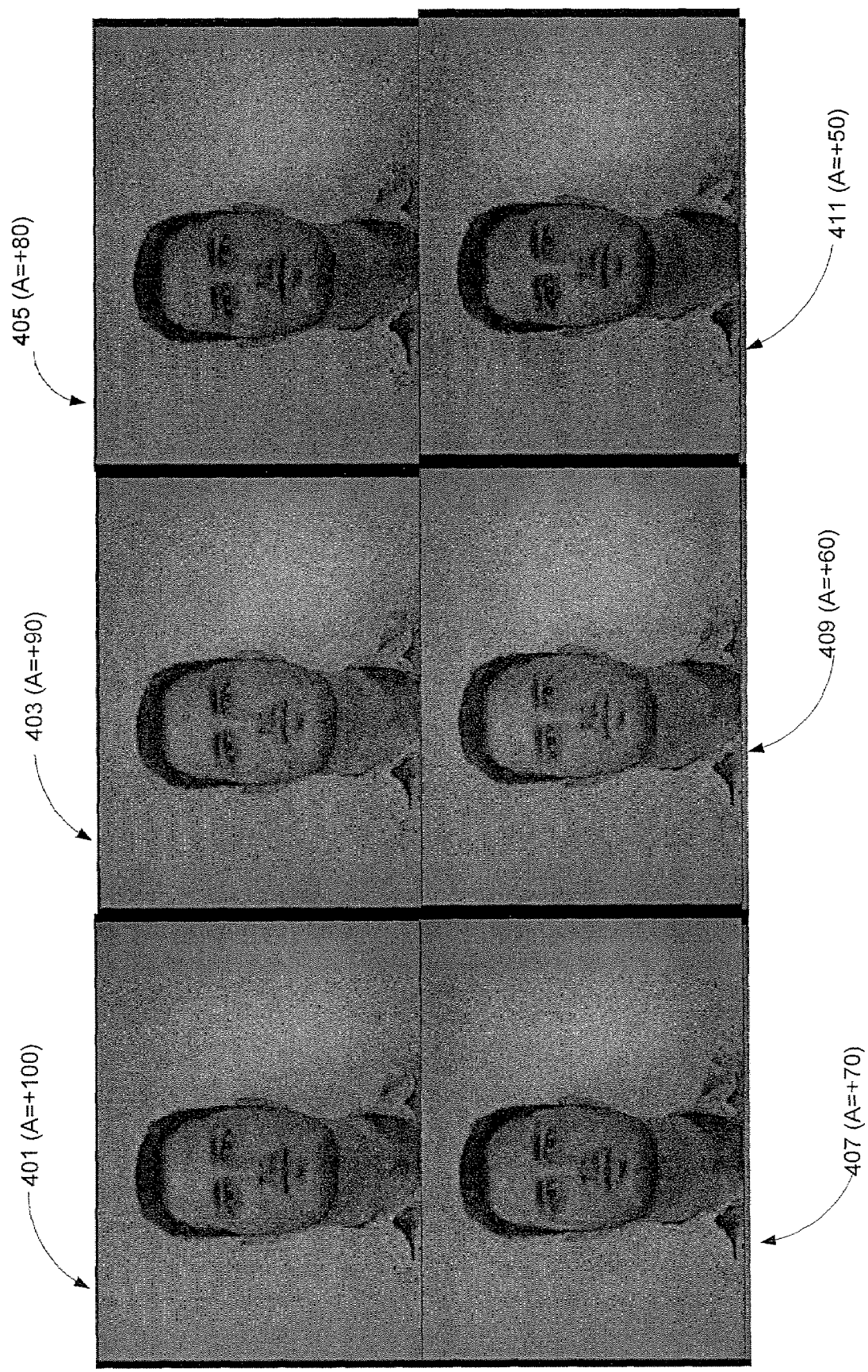
FIG. 4 shows visual results for altering a face image in accordance with an embodiment of the invention.

FIG. 4 shows visual results for altering a face image in accordance with an embodiment of the invention. Images 401 to 411 correspond to A=+100 to A=+50, respectively, which correspond to decreasing degrees of fattening.

With an embodiment of the invention, A=+100 corresponds to a maximum degree of fattening and A=−100 corresponds to a maximum degree of thinning. The value of A is selected to provide the desired degree of fattening or thinning. For example, if a patient were afflicted anorexia, the value of A would have a negative value that would depend on the degree of affliction and on the medical history and body type of the patient. As another example, a patient may be overeating or may have an unhealthy diet with many empty calories. In such a case, A would have a positive value. A medical practitioner may be able to gauge the value of A based on experience. However, embodiments of invention may support an automated implementation for determining the value of A. For example, an expert system may incorporate knowledge based on information provided by experienced medical practitioners.

Figure 5:
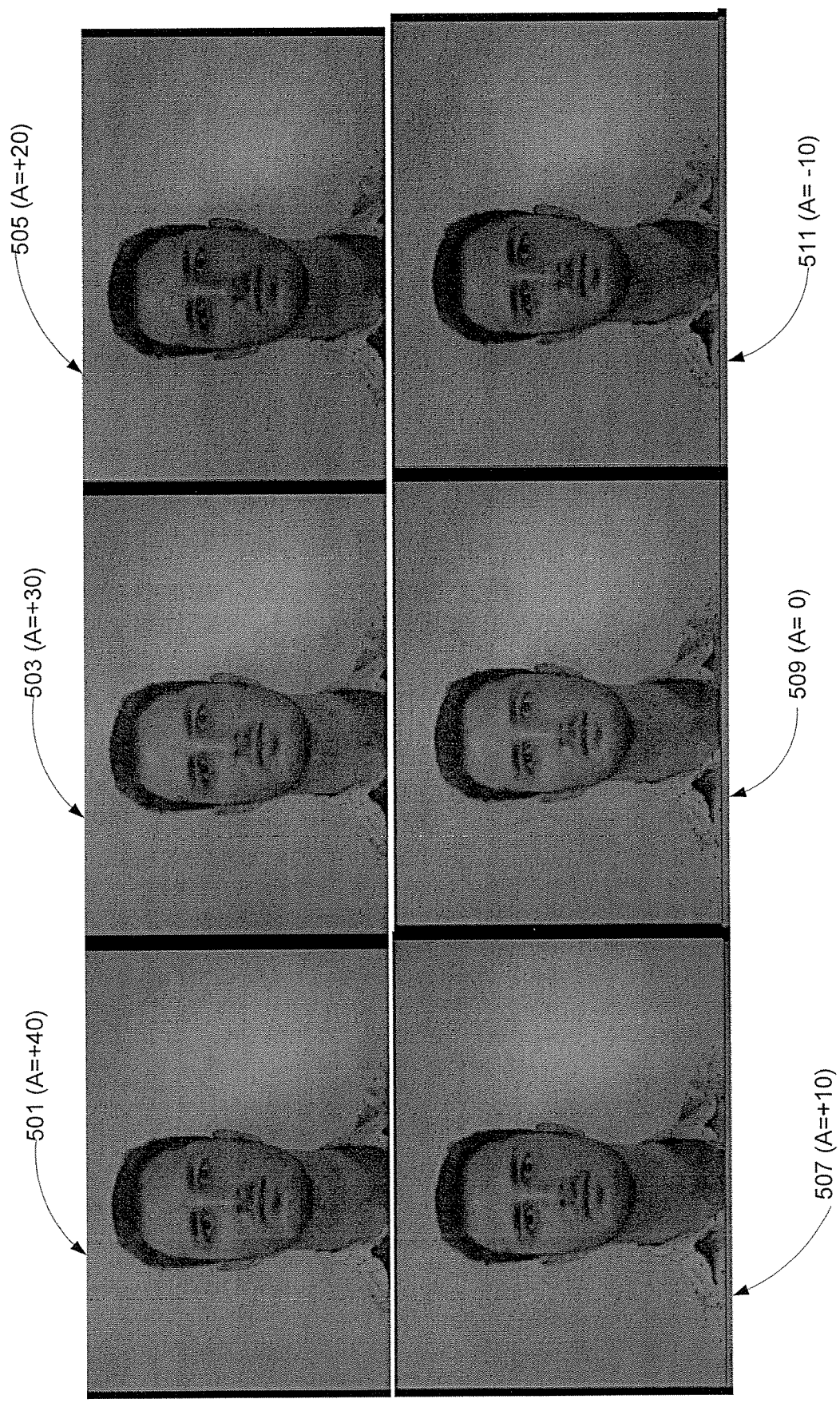
FIG. 5 shows additional visual results for altering a face image in accordance with an embodiment of the invention.

FIG. 5 shows additional visual results for altering a face image in accordance with an embodiment of the invention. Images 501-511, corresponding to A=+40 to A=−10, show the continued reduced sequencing of the fattening. When A=0 (image 509), the face is shown as it really appears. With A=−10 (image 511), the face is shows thinning. As A becomes more negative, the effects of thinning is increased.

Figure 6:
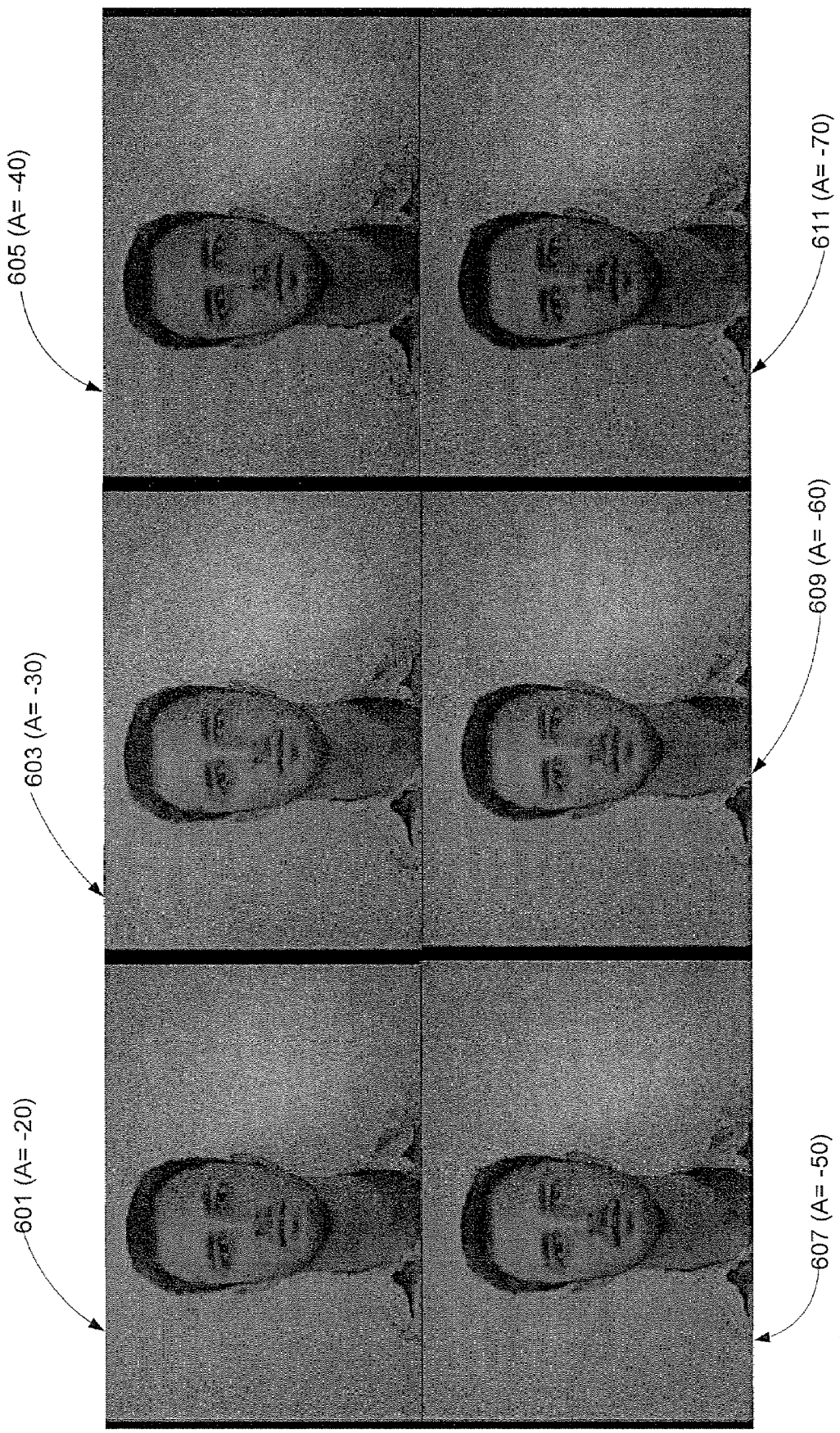
FIG. 6 shows additional visual results for altering a face image in accordance with an embodiment of the invention.

FIG. 6 shows additional visual results for altering a face image in accordance with an embodiment of the invention. Images 601-611 continue the sequencing of images with increased thinning (i.e., A becoming more negative).

Figure 7:
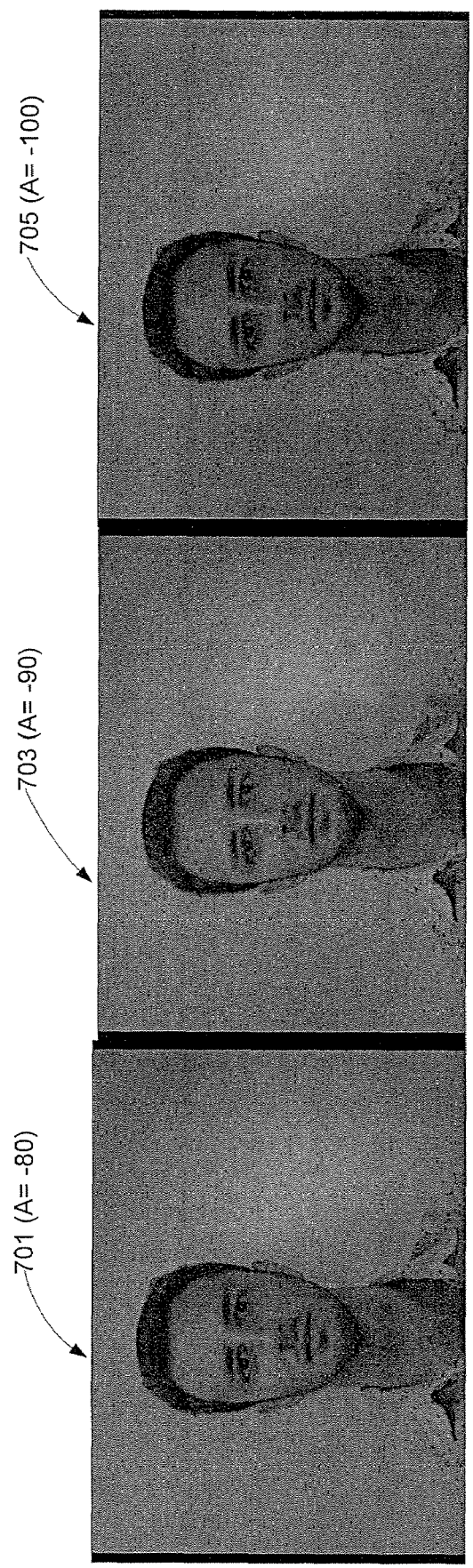
FIG. 7 shows additional visual results for altering a face image in accordance with an embodiment of the invention.

FIG. 7 shows additional visual results for altering a face image in accordance with an embodiment of the invention. Images 701-705 complete the sequencing of the images, in which the degree of thinning increases.

Figure 8:
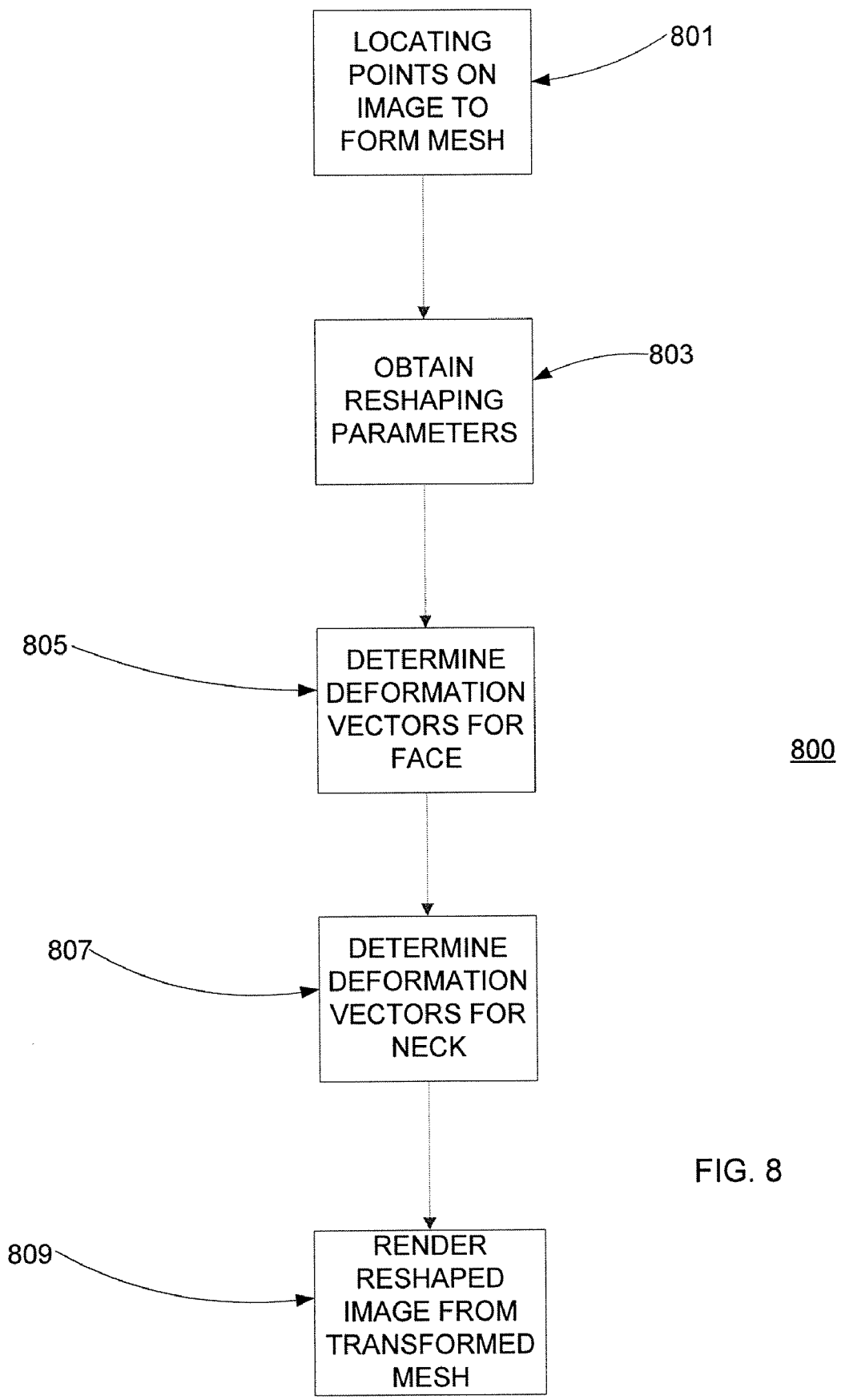
FIG. 8 shows a flow diagram for altering a face image in accordance with an embodiment of the invention.

FIG. 8 shows flow diagram 800 for altering a face image in accordance with an embodiment of the invention. In step 801, points are located on the image of the face and neck in order form a mesh. Points may be determined by a trained process or may be entered through an input device by a medical practitioner. In step 803, reshaping parameters (e.g., a weight value factor A) are obtained. The reshaping factors may be entered by the medical practitioner or may be determined by a process (e.g. an expert system) from information about the person associated with the face image.

In step 805 deformation vectors are determined and applied to points (e.g. points 306-331 as shown in FIG. 3) on the face. For example, as discussed above, EQs. 1-5. are used to determine the relocated points. In step 807 deformation vectors are determined (e.g., using EQs. 6-9) and applied to points (e.g., points 136-145 as shown in FIG. 1) on the neck. A transformed mesh is generated from which a reshaped image is rendered using computer graphics software in step 809.

Figure 9:
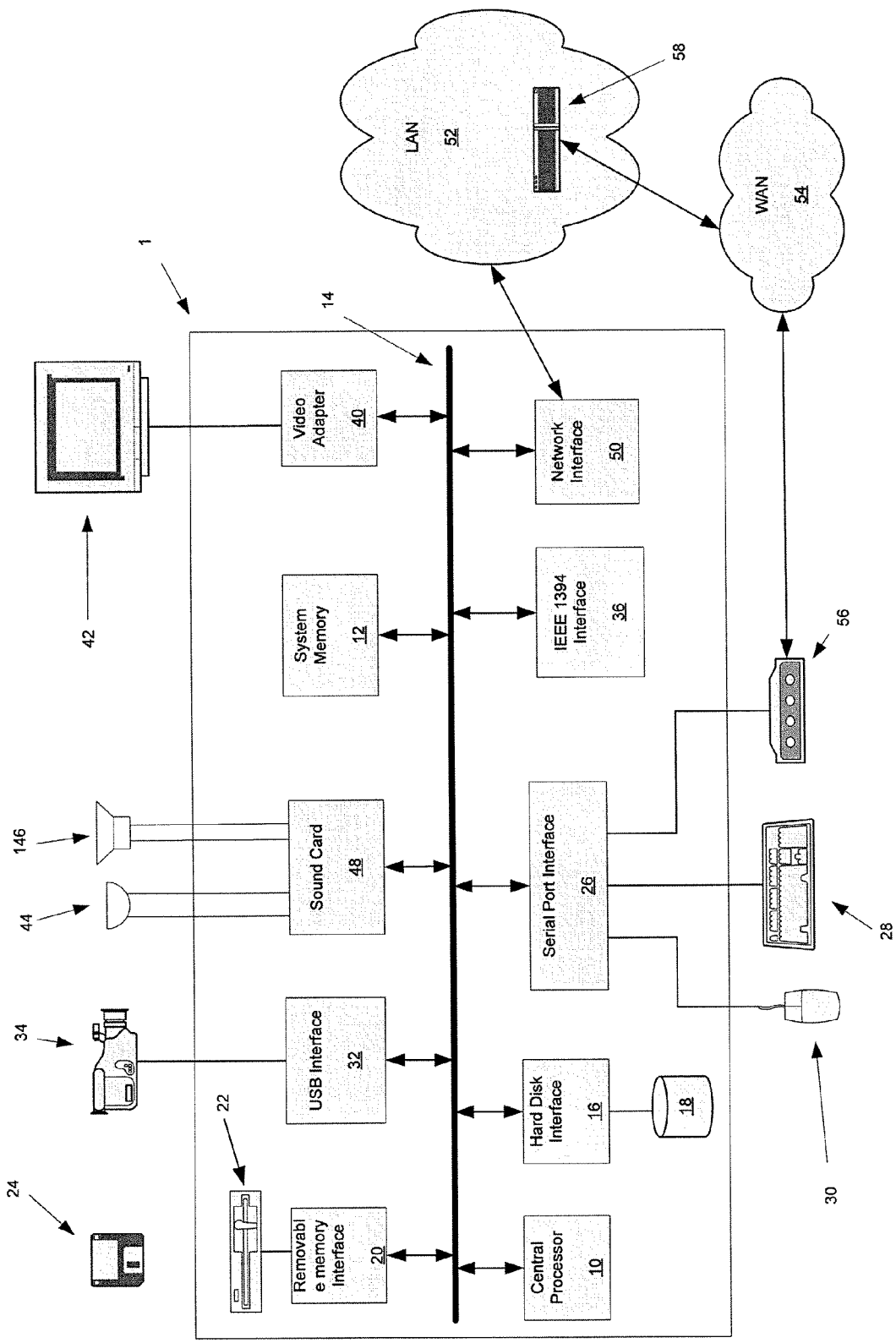
FIG. 9 shows an architecture of a computer system used in altering a face image in accordance with an embodiment of the invention.

FIG. 9 shows computer system 1 that supports an alteration of a face image in accordance with an embodiment of the invention. Elements of the present invention may be implemented with computer systems, such as the system 1. Computer system 1 includes a central processor 10, a system memory 12 and a system bus 14 that couples various system components including the system memory 12 to the central processor unit 10. System bus 14 may be any of several types of bus structures including a memory bus or memory controller, a peripheral bus, and a local bus using any of a variety of bus architectures. The structure of system memory 12 is well known to those skilled in the art and may include a basic input/output system (BIOS) stored in a read only memory (ROM) and one or more program modules such as operating systems, application programs and program data stored in random access memory (RAM).

Computer 1 may also include a variety of interface units and drives for reading and writing data. In particular, computer 1 includes a hard disk interface 16 and a removable memory interface 20 respectively coupling a hard disk drive 18 and a removable memory drive 22 to system bus 14. Examples of removable memory drives include magnetic disk drives and optical disk drives. The drives and their associated computer-readable media, such as a floppy disk 24 provide nonvolatile storage of computer readable instructions, data structures, program modules and other data for computer 1. A single hard disk drive 18 and a single removable memory drive 22 are shown for illustration purposes only and with the understanding that computer 1 may include several of such drives. Furthermore, computer 1 may include drives for interfacing with other types of computer readable media.

A user can interact with computer 1 with a variety of input devices. FIG. 7 shows a serial port interface 26 coupling a keyboard 28 and a pointing device 30 to system bus 14. Pointing device 28 may be implemented with a mouse, track ball, pen device, or similar device. Of course one or more other input devices (not shown) such as a joystick, game pad, satellite dish, scanner, touch sensitive screen or the like may be connected to computer 1.

Computer 1 may include additional interfaces for connecting devices to system bus 14. FIG. 7 shows a universal serial bus (USB) interface 32 coupling a video or digital camera 34 to system bus 14. An IEEE 1394 interface 36 may be used to couple additional devices to computer 1. Furthermore, interface 36 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 1 also includes a video adapter 40 coupling a display device 42 to system bus 14. Display device 42 may include a cathode ray tube (CRT), liquid crystal display (LCD), field emission display (FED), plasma display or any other device that produces an image that is viewable by the user. Additional output devices, such as a printing device (not shown), may be connected to computer 1.

Sound can be recorded and reproduced with a microphone 44 and a speaker 66. A sound card 48 may be used to couple microphone 44 and speaker 46 to system bus 14. One skilled in the art will appreciate that the device connections shown in FIG. 7 are for illustration purposes only and that several of the peripheral devices could be coupled to system bus 14 via alternative interfaces. For example, video camera 34 could be connected to IEEE 1394 interface 36 and pointing device 30 could be connected to USB interface 32.

Computer 1 can operate in a networked environment using logical connections to one or more remote computers or other devices, such as a server, a router, a network personal computer, a peer device or other common network node, a wireless telephone or wireless personal digital assistant. Computer 1 includes a network interface 50 that couples system bus 14 to a local area network (LAN) 52. Networking environments are commonplace in offices, enterprise-wide computer networks and home computer systems.

A wide area network (WAN) 54, such as the Internet, can also be accessed by computer 1. FIG. 7 shows a modem unit 56 connected to serial port interface 26 and to WAN 54. Modem unit 56 may be located within or external to computer 1 and may be any type of conventional modem such as a cable modem or a satellite modem. LAN 52 may also be used to connect to WAN 54. FIG. 7 shows a router 58 that may connect LAN 52 to WAN 54 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 1 can be operated in a client-server configuration to permit a user to retrieve web pages from a web-based server. Furthermore, any of various conventional web browsers can be used to display and manipulate data on web pages.

The operation of computer 1 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

In an embodiment of the invention, central processor unit 10 obtains a face image from digital camera 34. A user may view the face image on display device 42 and enter points (e.g., points 206-231 as shown in FIG. 2) to form a mesh that is subsequently altered by central processor 10 as discussed above. The user may identify the points with a pointer device (e.g. mouse 30) that is displayed on display device 42, which overlays the mesh over the face image. With embodiments of the invention, a face image may be stored and retrieved from hard disk drive 18 or removable memory drive 22 or obtained from an external server (not shown) through LAN 52 or WAN 54.

Adaptation of Deformation Factor for Pose Angularly Offset

Figure 10:
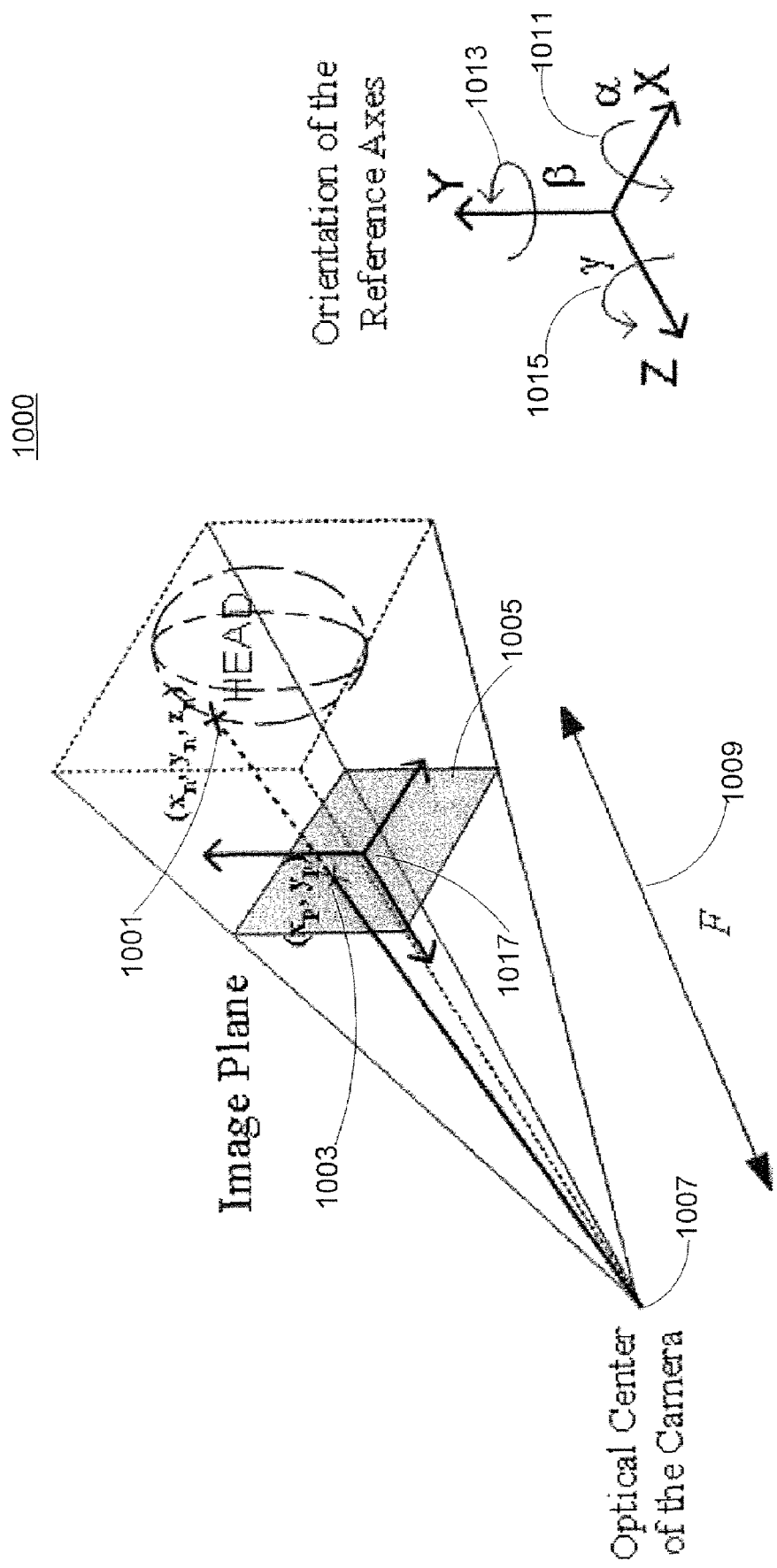
FIG. 10 shows a schema of a reference system and camera model for an adaptive process for processing an image in accordance with an embodiment of the invention.

FIG. 10 shows a schema of a reference system and camera model for an adaptive process for processing an image in accordance with an embodiment of the invention. Schema 1000 establishes a relationship of source point 1001 $(x_n, y_n, z_n)$ and corresponding projected point 1003 $(x_p, y_p)$ on camera image plane 1005. A source image consists of a collection of source points, and the corresponding camera image consists of a collection of projected points. (In FIG. 10, the source image is an image of a person's head or face. The source image may be an actual object or a visual representation of the actual object.)

The camera is characterized by optical center 1007 and focal length (F) 1009. The axis orientation of the camera is characterized by angles α 1011, β 1013, and γ 1015 corresponding to the x, y, and z axes, respectively. The origin of the axis orientation is located at the center of the camera image plane of the projected section that is shown in FIG. 10. Projected point 1003 $(x_p, y_p)$ is related to the corresponding source point 1001 by the following relationship:

$$(x_p, y_p) = \left( \frac{F \cdot x_n}{F - z_n}, \frac{F \cdot y_n}{F - z_n} \right) \quad \text{(EQ. 10)}$$

where F is the focal length of the camera.

With embodiments of the invention, one may assume that the face of the person is perpendicular to the axis orientation of the camera. Taking into account the 3D observation model detailed, as will be discussed, a direct pose occurs when $\alpha = \beta = \gamma = 0$.

Embodiments of the invention support image poses in which the pose is angularly offset. The correction factor for such a situation adapts the deformation factor w applied to the deformation vector of each vertex (e.g., as the vertices shown in FIG. 1) that is moved during the reshaping of the image (e.g., the face of a person). With an embodiment of the invention, the correction factor may be obtained from an angular displacement and a translation displacement of the source image from the camera image. The translation and the displacement may be determined from the difference from the 3D face pose in a frontal position (from which one has previously computed the weights) and the 3D pose of the face that one has actually taken the picture of.

The observation model utilized to relate the head in its neutral pose (source image facing the camera) and its projected representation taking into account the rigid motion (translations and rotations) of the head observed from reference origin 1017 and the projection due to the camera. Although the acquisition camera is not calibrated because one does not control the nature of the input sequences, one can still consider that it obtains a perspective projection and not an orthogonal projection.

Reference origin 1017 is situated along the optical axis of the camera at the center of camera image plane 1005. Camera image plane 1005 represents the video image where the face is focused. Focal distance F 1009, represents the distance from camera image plane 1005 to the optical center of the camera. To describe the rigid motion of the head, one may specify three translations, along the X, Y and Z-axes, and three rotations, around the X, Y, and Z axes. FIG. 10 presents the graphical interpretation of the model and the orientation of the reference axes.

One may describe points using their homogenous coordinates to be able to describe a perspective transform linearly and derive the relationship between 3D neutral coordinates and 2D projections.

A vector $(x, y, z, o)^T$ corresponds to a homogenous point if at least one of its elements is not 0. (o is the coordinate that is added to convert the coordinates to homogenous coordinates. Homogeneous coordinates allow affine transformations to be easily represented by a matrix. Also, homogeneous coordinates make calculations possible in projective space just as Cartesian coordinates do in Euclidean space. The homogeneous coordinates of a point of projective space of dimension n are typically written as (x:y:z: ... :o), a row vector of length n+1, other than (0:0:0: ... :0)). If a is a real number and is not 0, $(x, y, z, o)^T$ and $(ax, ay, az, ao)^T$ represent the same homogenous point. The relationship between a point in 3D or 2D Euclidean space and its homogenous representation is:

$(x, y, z)_{3D} \rightarrow (x, y, z, 1)_{3D}$ and $(x, y)_{2D} \rightarrow (x, y, 0, 1)_{2D}$ One can obtain the Euclidean representation of a homogenous point only if $o \neq 0$:

$(x, y, z, o)_H \rightarrow (x/o, y/o, z/o)_{3D}$ and $(x, y, o)_H \rightarrow (x/o, y/o)_{2D}$ As an example of projective space in three dimensions, there are corresponding homogeneous coordinates (x:y:z:o). The plane at infinity is typically identified with the set of points with o=0. Away from this plane, one can denote (x/o, y/o, z/o) as an ordinary Cartesian system; therefore, the affine space complementary to the plane at infinity is assigned coordinates in a similar way, with a basis corresponding to (1:0:0:1), (0:1:0:1), (0:0:1:1).

The following matrices represent different transformations that describe rigid motion, where $s_\alpha = \sin(\alpha)$, $c_\alpha = \cos(\alpha)$, $s_\beta = \sin(\beta)$, $c_\beta = \cos(\beta)$, $s_\gamma = \sin(\gamma)$, and $c_\gamma = \cos(\gamma)$.

Translation following vector $(t_X, t_Y, t_Z)^T$ $$T_{(t_X,t_Y,t_Z)} = \begin{bmatrix} 1 & 0 & 0 & t_X \\ 0 & 1 & 0 & t_Y \\ 0 & 0 & 1 & t_Z \\ 0 & 0 & 0 & 1 \end{bmatrix}.$$

Rotation by an angle of α radians around the X-axis:

$$R_{\alpha,X} = \begin{bmatrix} 1 & 0 & 0 & 0 \\ 0 & c_\alpha & -s_\alpha & 0 \\ 0 & s_\alpha & c_\alpha & 0 \\ 0 & 0 & 0 & 1 \end{bmatrix}.$$

Rotation by an angle of β radians around the Y-axis:

$$R_{\beta,Y} = \begin{bmatrix} c_\beta & 0 & s_\beta & 0 \\ 0 & 1 & 0 & 0 \\ -s_\beta & 0 & c_\beta & 0 \\ 0 & 0 & 0 & 1 \end{bmatrix}.$$

Rotation by an angle of γ radians around the Z-axis:

$$R_{\gamma,Z} = \begin{bmatrix} c_\gamma & -s_\gamma & 0 & 0 \\ s_\gamma & c_\gamma & 0 & 0 \\ 0 & 0 & 1 & 0 \\ 0 & 0 & 0 & 1 \end{bmatrix}.$$

The final location of the head regarding reference origin 1017 is obtained applying the translation and rotation matrices upon the coordinates of the head in its neutral pose.

$$x_{trans}^T = G \cdot x_n^T$$

where $$G = T_{(t_X,t_Y,t_Z)} \cdot R_{\alpha,x} \cdot R_{\beta,y} \cdot R_{\gamma,z}$$

Then, the position "head is facing the camera" is defined when $(t_X,t_Y,t_Z)^T=(0,0,0)$ α=0, β=0 and γ=0. The observed projection on camera image plane 1005 is:

$$x_p^T = P_F \cdot T_{(0,0,-F)} \cdot x_{trans}^T,$$

where $$P_F \cdot T_{(0,0,-F)} = \begin{bmatrix} F & 0 & 0 & 0 \\ 0 & F & 0 & 0 \\ 0 & 0 & -1 & -2F \\ 0 & 0 & -1 & 0 \end{bmatrix} \cdot \begin{bmatrix} 1 & 0 & 0 & 0 \\ 0 & 1 & 0 & 0 \\ 0 & 0 & 1 & -F \\ 0 & 0 & 0 & 1 \end{bmatrix}$$

$$= \begin{bmatrix} F & 0 & 0 & 0 \\ 0 & F & 0 & 0 \\ 0 & 0 & -1 & -F \\ 0 & 0 & -1 & F \end{bmatrix}$$

represents the complete projection from the combination of the perspective projection matrix, $P_F$, whose origin is located on the optical center of the camera and the translation −F along the Z-axis, and $T_{(0,0,-F)}$, which relocates the origin of the reference axis on the image plane (just as with the observation model shown in FIG. 10). One obtains the following expression to relate the homogenous coordinates of the points belonging to the head in its neutral pose and their observed equivalent representation on camera image plane 1005:

$$\begin{bmatrix} x_p \\ y_p \\ z_p \\ o_p \end{bmatrix} = \begin{bmatrix} Fc_\beta c_\gamma & -Fc_\beta s_\gamma & Fs_\beta & Ft_X \\ F(c_\alpha s_\gamma + s_\alpha s_\beta c_\gamma) & F(c_\alpha c_\gamma - s_\alpha s_\beta s_\gamma) & F(-s_\alpha c_\beta) & Ft_Y \\ c_\alpha s_\beta c_\gamma - s_\alpha c_\gamma & -c_\alpha s_\beta c_\gamma - s_\alpha c_\gamma & -c_\alpha c_\beta & -t_Z - F \\ c_\alpha s_\beta c_\gamma - s_\alpha c_\gamma & -c_\alpha s_\beta c_\gamma - s_\alpha c_\gamma & -c_\alpha c_\beta & -t_Z + F \end{bmatrix} \cdot \begin{bmatrix} x_n \\ y_n \\ z_n \\ o_n \end{bmatrix}$$

After transforming the homogenous coordinates to Euclidean space coordinates (o=1 and $z_p$ is not taken into account), the observation $(x_p, y_p)_{2D}^T$ on the image plane of a given point $(x_n, y_n, z_n)_{3D}^T$ belonging to the face in its neutral pose is:

$$\begin{bmatrix} x_p \\ y_p \end{bmatrix}_{2D} = \frac{F}{N} \begin{bmatrix} c_\beta c_\gamma x_n - c_\beta s_\gamma y_n + s_\beta z_n + t_X \\ (s_\alpha s_\beta c_\gamma + c_\alpha s_\gamma)x_n - (s_\alpha s_\beta s_\gamma + c_\alpha c_\gamma)y_n - \\ s_\alpha c_\beta z_n + t_Y \end{bmatrix}$$

$$N = (c_\alpha s_\beta c_\gamma - s_\alpha s_\gamma)x_n + (-c_\alpha s_\beta s_\gamma - s_\alpha c_\gamma)y_n - c_\alpha c_\beta z_n - t_z + F$$

For each of the vertices i to be moved during the reshaping of the face (referring to FIG. 2) according to the new deformation factor $w^{new}$.

$$w^{new}_i = w_i \cdot (r_i(\alpha,\beta,t_z)+1) \tag{EQ. 11}$$

where $$r_i(\alpha, \beta, t_z) = \left(\frac{\alpha \cdot (y_{c1} - y_i) + \beta \cdot (x_i - x_{18})}{E}\right) + \frac{t_z}{G} \tag{EQ. 12}$$

$x_i$ and $y_i$ are the 2D coordinates of the vertices on the $i^{th}$ image as the have been determined on the mesh and not on the 3D observation model. With embodiments of the invention, $x_{18}$ and $y_{c1}$ refer to point 218 and point 251, respectively, as shown in FIG. 2. One should note that the Y-axis of the observation model and the Y-axis of the reference system for the mesh are inverted; thus, the consideration of one system or the other does change how the adaptation should be treated. E and G are scale values that are determined empirically in each system that uses this approach. E controls the amount of deformation due to the rotations and G controls the influence of the distance of the person to the camera. Once the "neutral" position of a face on a picture is determined for a concrete instance of the system (neutral meaning α=β=γ=tz=$t_y$=$t_z$=0), E and G are chosen so that correction function r stays within reasonable limits. (For most implementations that would be from 0 to 1.) E scales down the units from the image vertices coordinates (x,y) and sets how much influence the angles have with respect to the face translation. G scales down the units from the z-translation on the 3D model used and also sets the influence of this parameter in the rectifying factor. For example, E takes a value of the order of magnitude of the face coordinate units (e.g., ($y_{c1}$-$y_i$) & ($x_i$-$x_{18}$) max value=1500, E~2000*2*3.1415~12000) and the same applies to G regarding $t_z$ (e.g., $t_z$ max value 60, G~100*2~200). In the given example, E and G would have approximately equivalent influence accounting for half of the influence in the final rectification.

From EQs. 11 and 12, a deformation factor w (e.g., as determined with EQs. 4A-4D) is multiplied by a correction factor $r(\alpha,\beta,t_z)+1$ in order obtain a new (corrected) deformation factor $w^{new}$. From EQs. 1-5B, a corrected deformation vector is determined. Each deformation vector is applied to a corresponding vertex to obtain a transformed mesh. Experimental data using EQs. 11-12 have been obtained for angular displacement α 1011 varying between ±0.087 radians and angular displacement β 1013 varying between ±0.17 radians.

As can be appreciated by one skilled in the art, a computer system (e.g., computer 1 as shown in FIG. 9) with an associated computer-readable medium containing instructions for controlling the computer system may be utilized to implement the exemplary embodiments that are disclosed herein. The computer system may include at least one computer such as a microprocessor, a cluster of microprocessors, a mainframe, and networked workstations.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method for altering a camera image comprising:
   locating a plurality of points on the camera image;
   generating a mesh from the plurality of the points, the mesh being superimposed on the camera image and associated with corresponding texture information of the camera image;
   determining compensation information based on a translational displacement or an angular displacement being between a source image and the camera image, comprising;
   determining a weight value factor (A), a scale factor (s), a deformation factor (w), and a direction vector ($\vec{u}$),
   obtaining a correction factor ($r(\alpha, \beta, t_z)+1$) based on the translation displacement or the angular displacement between the source image and the camera image,
   generating a corrected deformation factor ($w^{new}$) by multiplying the deformation factor (w) by the correction factor ($r(\alpha, \beta, t_z)+1$), and
   determining a deformation vector ($\vec{v}_d$) from a product of the weight value factor (A), the scale factor (s), the corrected deformation factor ($w^{new}$), and the direction vector ($\vec{u}$); and
   altering the camera image by relocating a proper subset of the points on the camera image by applying the deformation vector ($\vec{v}_d$) to one or more points of the proper subset of points.

2. The method of claim 1, wherein determining compensation information comprises:
   determining the scale factor, the deformation vector ($\vec{v}_d$) being independent of an image size.

3. The method of claim 1, wherein determining compensation information comprises:
   determining the direction vector from a difference between a center and said one of the proper subset of points.

4. The method of claim 1, wherein determining compensation information comprises:
   determining the weight value factor from a desired amount of fattening or thinning.

5. The method of claim 1, comprising:
   obtaining matrices corresponding to the translation and angular displacements; and
   multiplying the matrices to obtain projected points on the camera image.

6. The method of claim 1, comprising:
   obtaining a transformed mesh from the mesh; and
   rendering the altered image from the transformed mesh and the corresponding texture information.

7. The method of claim 1, the camera image including a face of a person and comprising altering the camera image to obtain a desired degree of fattening or thinning for the face of the person.

8. A non-transitory computer-readable medium having computer-executable instructions to perform the steps comprising:
   locating a plurality of points on the camera image;
   generating a mesh from the plurality of the points, the mesh being superimposed on the camera image and associated with corresponding texture information of the camera image;
   determining compensation information based on a translational displacement or an angular displacement between a source image and the camera image, comprising:
   determining a weight value factor (A), a scale factor (s), a deformation factor (w), and a direction vector ($\vec{u}$),
   obtaining a correction factor ($r(\alpha, \beta, t_z)+1$) based on the translational displacement or the angular displacement between the source image and the camera image,
   generating a corrected deformation factor ($w^{new}$) by multiplying the deformation factor (w) by the correction factor ($r(\alpha, \beta, t_z)+1$), and
   determining a deformation vector ($\vec{v}_d$) from a product of the weight value factor (A), the scale factor (s), the corrected deformation factor ($w^{new}$), and the direction vector ($\vec{u}$); and
   reshaping the camera image by relocating a proper subset of the points on the camera image by applying the deformation vector ($\vec{v}_d$) to one or more points of the proper subset of points.

9. A computer medium of claim 8, having computer-executable instructions to perform the steps comprising:
   obtaining matrices corresponding to the translation and angular displacements; and
   multiplying the matrices to obtain projected points on the camera image.

10. The computer medium of claim 8, having computer-executable instructions to perform the steps comprising:
    obtaining a transformed mesh from the mesh; and
    rendering the altered image from the transformed mesh and the corresponding texture information.

11. An apparatus for altering a camera image, comprising:
    an input device configured to obtain a plurality of points on the camera image; and
    a processor configured to:
    locate a plurality of points on the camera image;
    generate a mesh from the plurality of the points, the mesh being superimposed on the camera image and associated with corresponding texture information of the camera image;
    determine compensation information based on a translational displacement or an angular displacement between a source image and the camera image, comprising;
    determining a weight value factor (A), a scale factor (s), a deformation factor (w), and a direction vector ($\vec{u}$),
    obtaining a correction factor ($r(\alpha, \beta, t_z)+1$) based on the translation displacement or the angular displacement between the source image and the camera image, generating a corrected deformation factor ($w^{new}$) by multiplying the deformation factor (w) by the correction factor ($r(\alpha, \beta, t_z)+1$), and determining a deformation vector ($\vec{v}_d$) from a product of the weight value factor (A), the scale factor (s), the corrected deformation factor ($w^{new}$), and the direction vector ($\vec{u}$); and alter the camera image by relocating a proper subset of the points on the camera image by applying the deformation vector ($\vec{v}_d$) to one or more points of the proper subset of points.

12. The apparatus of claim 11, wherein the processor is configured to:

determine the scale factor, the deformation vector ($\vec{v}_d$) being independent of an image size.

13. The apparatus of claim 11, wherein the processor is configured to determine the direction vector from a difference between a center and said one of the proper subset of points.

14. The apparatus of claim 11, wherein the processor is configured to determine the weight value factor from a desired amount of fattening or thinning.

15. The apparatus of claim 11, wherein the processor is configured to:

obtain matrices corresponding to the translation and angular displacements; and multiply the matrices to obtain projected points on the camera image.

16. The apparatus of claim 11, wherein the processor is configured to: obtain a transformed mesh from the mesh; and render the altered image from the transformed mesh and the corresponding texture information.

17. The apparatus of claim 11, the camera image including a face of a person and the processor is configured to alter the camera image to obtain a desired degree of fattening or thinning for the face of the person.

* * * * *

UNITED STATES PATENT AND TRADEMARK OFFICE
CERTIFICATE OF CORRECTION

| | | |
|---|---|---|
| PATENT NO. | : 7,953,294 B2 | Page 1 of 1 |
| APPLICATION NO. | : 11/674255 | |
| DATED | : May 31, 2011 | |
| INVENTOR(S) | : Ana Cristina Andres del Valle | |

It is certified that error appears in the above-identified patent and that said Letters Patent is hereby corrected as shown below:

On the Title Page, Item (56), "OTHER PUBLICATIONS", please delete

"Danino, Udy et al. "Algorithm for Facial Weight-Change, Proc. 11th IEEE Internationa~ Conference on Electronics, Circuits and Systems CICES2004), Tel Aviv, Israel, 2004, pp. 3~8-321."

At column 11, line 30, after "displacement" delete "being";

At column 11, line 31, delete "comprising;" and insert --comprising:--;

At column 11, line 36, delete "translation" and insert --translational--;

At column 12, line 60, delete "comprising;" and insert --comprising:--;

At column 12, line 64, delete "translation" and insert --translational--.

Signed and Sealed this
Nineteenth Day of July, 2011

David J. Kappos
*Director of the United States Patent and Trademark Office*